United States Patent
Galvin

[11] Patent Number: 6,134,315
[45] Date of Patent: *Oct. 17, 2000

[54] METADATA-BASED NETWORK ROUTING

[75] Inventor: Brian Galvin, El Granada, Calif.

[73] Assignee: Genesys Telecommunications Laboratories, Inc., San Francisco, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/940,353

[22] Filed: Sep. 30, 1997

[51] Int. Cl.$^7$ .................................................. H04M 7/00
[52] U.S. Cl. ........................ 379/219; 379/207; 379/221; 379/265
[58] Field of Search .................................. 379/265, 266, 379/309, 210, 211, 900, 219, 220, 221, 229, 230, 201, 207

[56] References Cited

U.S. PATENT DOCUMENTS

| | | | |
|---|---|---|---|
| 4,951,310 | 8/1990 | Honda et al. | 379/266 |
| 4,953,204 | 8/1990 | Cuschleg, Jr. et al. | 379/266 |
| 5,291,552 | 3/1994 | Kerrigan et al. | 379/266 |
| 5,299,259 | 3/1994 | Otto | 379/266 |
| 5,452,350 | 9/1995 | Reynolds et al. | 379/265 |
| 5,524,147 | 6/1996 | Bean | 379/266 |
| 5,592,542 | 1/1997 | Honda et al. | 379/266 |
| 5,594,792 | 1/1997 | Chouraki et al. | 379/269 |
| 5,633,924 | 5/1997 | Kaish et al. | 379/266 |
| 5,740,238 | 4/1998 | Flockhart et al. | 379/266 |
| 5,754,639 | 5/1998 | Flockhart et al. | 379/266 |

*Primary Examiner*—Krista Zele
*Assistant Examiner*—Benny Q. Tieu
*Attorney, Agent, or Firm*—Donald R. Boys; Central Coast Patent Agency

[57] ABSTRACT

A customer-maintained routing system for providing routing to a network provider for incoming calls from clients to the customer comprises a processor having a data link adapted for connection to a customer access point provided by the network provider, a router adapted to execute on the processor and to provide routing to the network via the customer access point, and a metadata-based information system maintained in RAM accessible to the processor and containing condensed client characteristics. Upon receiving a request from the network including a call identifier, the router accesses the database using the identifier as a key, retrieves client characteristics from the information system, and provides a destination for the call to the network based on the retrieved client characteristics. In some embodiments the processor is linked to plural customer sites by a wide area data network. Some of the linked sites may be customer premises call centers where calls are directed, and at least one may be a central customer database facility wherein client and/or characteristics are maintained and updated, and periodic updates are provided to distributed databases at customer access points and customer call centers.

12 Claims, 2 Drawing Sheets

METADATA-BASED NETWORK ROUTING

FIELD OF THE INVENTION

The present invention is in the field of telephony communication and has particular application to methods including software for routing telephone calls in a network.

BACKGROUND OF THE INVENTION

Telephone call processing and switching systems are, at the time of the present patent application, relatively sophisticated, highly engineered computerized systems, and development and introduction of new systems continues. Much information on the nature of such hardware and software is available in a number of publications accessible to the present inventors and to those with skill in the art in general. For this reason, much minute detail of known systems is not reproduced here, as to do so may obscure the facts of the invention.

At the time of filing the present patent application there continues to be remarkable growth in telephone-based information systems. Recently emerging examples are telemarketing operations and technical support operations, among many others, which have grown apace with development and marketing of, for example, sophisticated computer equipment. More traditional are systems for serving clients of large insurance companies and the like. In some cases organizations develop and maintain their own telephony operations with purchased or leased equipment, and in many other cases, companies are outsourcing such operations to firms that specialize in such services.

In any case, there exist today large and sophisticated call center operations maintained by organizations, mostly for-profit corporations, for serving large client bases. In many cases these call center operations are distributed architectures of national and even international scale.

A company maintaining one or more call centers for serving clients typically provides one or more telephone numbers to the public or to their client base, or both, that may be used to reach the service. In larger operations, these numbers are typically "toll-free" numbers, which bring an incoming call typically to a local switch, where the number causes the switch to access a processor called in the art a service control point (SCP). An SCP typically comprises a database maintained by a telecommunications carrier and a router, and has routing tables containing simple routing destinations.

After a call is routed to a call center, which may be one of several or many maintained by a service provider, further routing may be done. Rerouting of various sorts is done as well, depending on loading, further information elicited from a caller, special circumstances, and the like. Routing of calls, then, may be on several levels. Pre-routing may be done at SCPs and further routing may be, and almost always is, accomplished at individual call centers.

A call center typically involves a telephony switch, which may be, for example, a Private Branch Exchange (PBX). The call center switch is connected to the PSTN network by one or more trunks as is well-known in the art. Agents, trained to accomplish the host organization's goals, man telephones connected to the central switch, and in many cases other equipment as well, such as multimedia-capable computers.

For many reasons and purposes additional computer capability in the art has been added for call centers by connecting processors adapted to run control routines and to access databases. The process of incorporating computer enhancement to telephone switches is known in the art as Computer Telephony Integration (CTI), and the hardware used is referred to as CTI equipment.

In a CTI system telephone stations connected to the central switch may be equipped also with computer platforms, as mentioned above, so agents manning such stations may have access to stored data as well as being linked to incoming callers by a telephone connection. Agents may also be party to many network-based applications for enhancing client service. Such stations may be interconnected in networks by any one of several known network protocols, with one or more servers also connected to the s network. One or more of these servers may also be connected to a processor providing CTI enhancement, also connected to the central switch of the call center. It is this processor that typically provides CTI enhancement for the call center.

In call center operations, especially in large and distributed operations, call-routing ability and efficiency is crucial. The time it takes to connect a caller to an agent affects customer satisfaction and hence business image. Mistakes in routing, connecting callers for example to overloaded centers or to agents not prepared to help with the client's difficulty or desire, is troublesome. Improvements in routing techniques and speed are therefore generally desirable.

At the time of the present patent application, telecommunications network providers have occasionally made available to third parties an interface to what they term Advanced Intelligent Networks (AIN), for the purpose of allowing businesses to make routing decisions about telephone calls addressed to the particular business, while these calls are still passing through the telephone network. The connections at which customer access to network routing is made available are termed in the art Customer Access Points (CAP). There are advantages to the businesses in making routing decisions while calls are still in the network. Firstly, calls can be routed more quickly since they do not first have to be delivered to one of the business' premises (call center). This speed of routing reduces time from a client's having dialed the phone to their receiving an answer from the business, which in turn improves customer satisfaction.

With increasing competition in all markets, increasing customer satisfaction is an essential element to survival for most businesses. Additionally, routing calls in the network reduces the costs to the business of most calls, since calls are not inadvertently delivered to an overloaded call center where they must wait, which accrues connect charges. Also, if a business were to decide to "overflow" calls from a first center to a second due to overloading at the first center, doing so requires a second call to be made from the first to the second center, thus increasing connect charges once again.

An advantage to the telecommunications carrier of providing a customer access point to the network is primarily one of improving the telecommunications carrier's competitive position vis-a-vis other telecommunications carriers, since the network interface adds value for the telecommunications carrier's business customers.

An important feature of customer access point routing techniques offered by telecommunications carriers is that a call is never actually terminated in the network. The call arrives at a switch in the network and the switch requests routing instructions from an SCP computer. When a customer access point is available, the SCP requests routing instructions from the customer's connected data systems.

Since the call is sitting in the switch just as it would be were the telecommunications carrier to route it, it is important that a decision be delivered rapidly to the telecommunications carrier. Otherwise, the call will occupy a port, or position, in the switch for an excessive period of time, which will cause other callers to receive a busy signal.

Networks are highly engineered systems, and overtime situations are avoided by establishing a strict time frame within which a customer's data systems must deliver a routing instruction to the SCP. If this time limit is not met, the SCP delivers a default routing instruction to the switch and the call is sent on its way. Typically, if too many failed requests are received from a provider's customer, the customer may lose the privilege of maintaining an independent access point to the network.

Because of the tight time restrictions made on customer access points, it has not been possible at the time of this patent application for businesses to conduct elaborate routing decisions in the network by making use of customer access points. Rather, existing uses of customer access point routing are limited to such load balancing between several distributed call centers. While load balancing is in itself a valuable capability, there are many more valuable routing criteria that could be used if time permitted. For example, routing decisions could be based on sophisticated business rules.

An example of business rule routing may help to make this concept clear. A brokerage house, for example, might desire to first check whether a call is from a known client. Such a check can be done using the Automated Number Identification (ANI) data, provided by the network with the call, which identifies the number from which the call was made. If this number matches a known client number, then it may be assumed that the call is from that client. Next, the business may want the client's account to be examined to find out the client's characteristics. For example, clients with high net worth and active trading record who prefer technology stocks, might be preferentially routed to the group of brokers who specialize in high tech stocks and are active traders themselves. On the other hand, an equally affluent client who generally buys and holds a broad portfolio of stocks could be routed to a general broker who is trained to handle high net worth individuals (premium service routing). And, a client who has no money invested currently could be routed to an interactive voice response (IVR) unit, which can answer most questions without occupying an (expensive) agent's time.

The problem with current sophisticated routing procedures being implemented at customer access points within the network is one of time constraint as briefly described above with reference to "time restrictions made on customer access points". So being, any rules-based routing attempted beyond simple caller identification and processing the call to an appropriate call center would most likely cause that particular call to remain in the port or switch at the SCP for a period beyond what is allowed.

At the time of this patent application there are no network-level routing protocols or methods that allow sophisticated "business rules" routing, or other complicated routing procedures for routing telephone calls from the SCP to a final destination number, without terminating the original call in the network or holding it in queue at an overloaded call center for an extended period resulting in further connection charges.

What is clearly needed is a method and apparatus allowing sophisticated routing of calls to be performed by individual businesses at the network level (i.e. at an SCP customer access point) within the time constraints imposed on the customer access switches. A method such as this would save costs of reconnection charges and allow for the elimination of secondary company-hosted queue destinations where more sophisticated routing is typically performed.

SUMMARY OF THE INVENTION

In a preferred embodiment a method for routing telephone calls in a telephony network maintained by a network service provider is provided, comprising steps of (a) accepting a call from a caller at a network routing point; (b) providing access to the network routing point to a customer of the network service provider for routing the call; (c) cross-referencing an identifier associated with the call to a database entity in a metadata-based information system maintained by the customer; and (d) providing a routing destination to the network for routing the call to a selected one of plural customer facilities based on the metadata-based information retrieved.

The metadata information system is preferably maintained in random access memory (RAM), and the processor may be connected in a data network to a central system which may periodically update the RAM system. There may also be plural distributed metadata RAM systems at plural customer sites, all or some periodically updated by the central system. Routing of a single call may thus be accomplished at plural levels. Instead of RAM, any other type of sufficiently fast memory or storage could be substituted, such as Flash, optical, non-moving magnetic etc.

In another aspect a customer-maintained routing system for providing routing to a network provider for incoming calls from clients to the customer is provided, comprising a processor having a data link adapted for connection to a customer access point provided by the network provider, a router adapted to execute on the processor and to provide routing to the network via the customer access point, and a metadata-based information system maintained in RAM accessible to the processor and containing condensed client characteristics. In this system, upon receiving a request from the network including a call identifier, the router accesses the database using the identifier as a key, retrieves client characteristics from the information system, and provides a destination for the call to the network based on the retrieved client characteristics. In the system the processor may be linked by a wide area data network to plural customer sites, at least one of which comprises a central database, and at least one of which is a computer-telephony integration (CTI) processor connected to a telephony switch at a customer call center to which incoming calls to the customer may be routed. There may also be a second metadata-based information system maintained in RAM at at least one of the customer call centers to which incoming calls may be routed, and wherein the call center supports a router adapted to access the metadata information system, and to further route a call routed to the call center, and these local metadata-based information systems may be periodically updated from a central customer metadata system via the wide area data network.

In various embodiments of the system and methods of practicing the invention, a customer of a telephony network is enabled to provide business-rules routing decisions in a very short time to a network via a network provided customer access point, typically within the time constraints imposed by the network provider.

BRIEF DESCRIPTION OF THE DRAWING FIGURES

DESCRIPTION OF THE PREFERRED EMBODIMENTS

Figure 1:
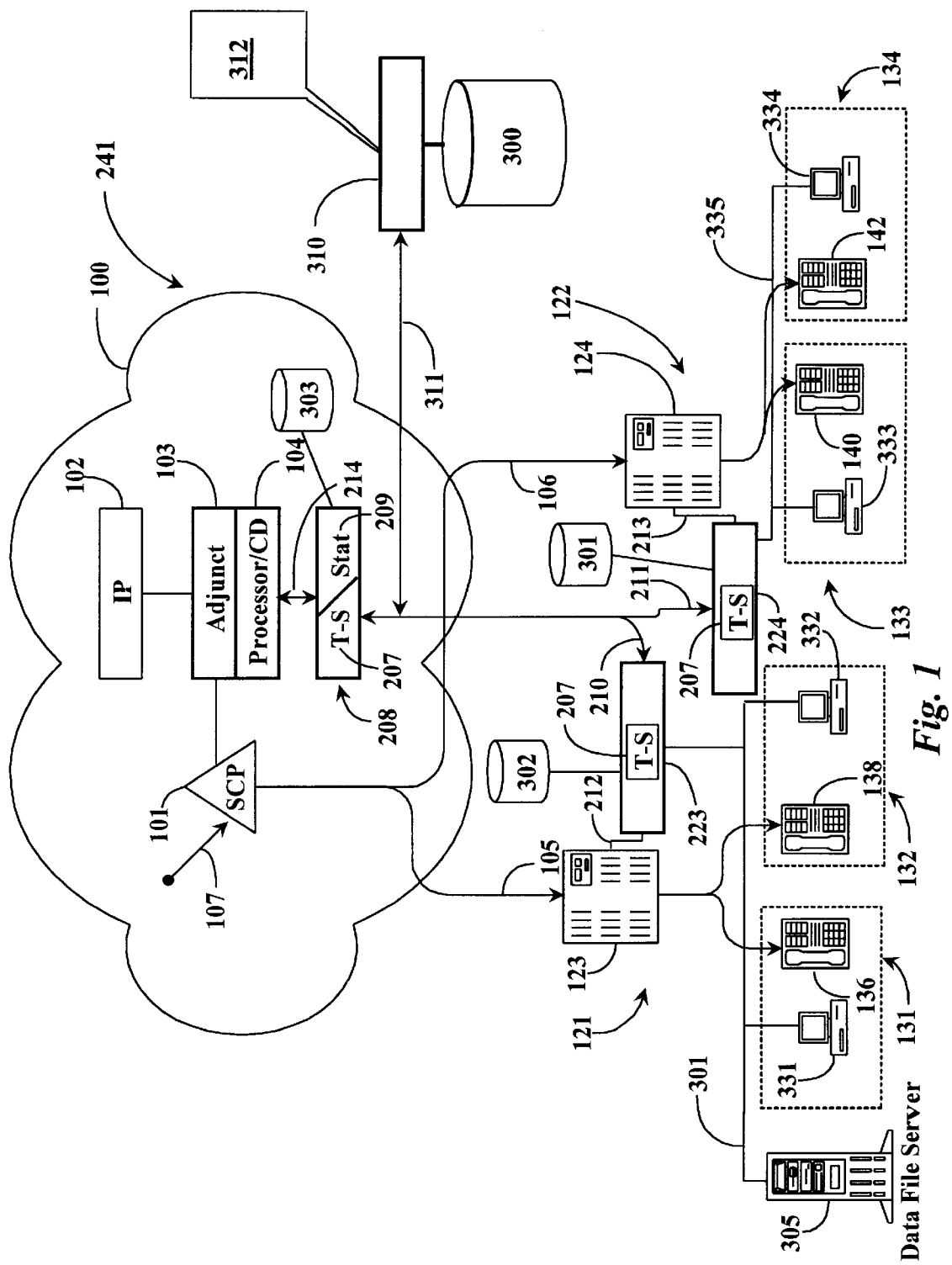
FIG. 1 is an architectural overview of a call center network enhanced with a metadata routing system according to an embodiment of the present invention.

FIG. 1 is an architectural overview of a system 241 enhanced with a metadata-based routing according to an embodiment of the present invention, wherein sophisticated routing is possible from a customer access point at or near a service control point (SCP) 101. SCP 101 is a point of arrival for incoming calls, represented by a vector 107, entering the system. SCP 101, in this embodiment, also provides a customer access point as described in the background section above. The telephone network is represented by cloud 100, and in this example is a publicly-switched telephone network (PSTN). There may be more than one SCP in network cloud 100.

In this example, call centers belonging to a single corporate customer of the network provider are shown, and it is this customer that exercises routing access at the customer access point. A network may have several SCPs such as SCP 101 some or all of which may maintain customer access points, and there may of course be many customers having call centers connected to the network.

In this example, at SCP 101, an adjunct processor 103 is connected and may include or be connected to an intelligent peripheral 102 providing such features as Interactive Voice Response (IVR). Also, not shown, there is a network router SW present in one of the processors for providing default routing. An additional processor 208 connected to processor 103 by link 214 contains an instance of a CTI application known to the inventors as a T-server 207 and an instance of a statistical server (Stat-server) 209. T-server 207 is capable of providing routing instruction to SCP 101 through processor 103. Stat-server 209 typically provides compiled statistics related to customers, agents, system status, and the like that are used by T-server 207 to help decide the best way to rout incoming calls 107. CTI applications such as T-server 207 and Stat-server 209 may also reside in adjunct processor 103 which also has a call distributor (CD), or in a separate processor as shown in this embodiment. The T-server and the Stat-server are customer applications, (not provided by the network provider).

CTI elements that have been described thus far and are present within network cloud 100 are used in conjunction with the method and apparatus of the present invention to provide sophisticated routing at SCP 101. The level of sophisticated routing that may be done at a customer access point is limited by a time constraint placed on the telephony switch associated with SCP 101, as described above. This time constraint is imposed by the service telecommunications carrier at the network level switch for the purpose of reducing possible overtime problems caused when a call resides in port to long. If routing instructions are not delivered to the switch within the allotted time, the call is routed via default instruction to a separate destination (usually a distributed call center) where further routing can be applied without time constraint. Therefore, conventional routing at the network level is typically limited to distributing calls to appropriate telephony switches (call center switches) maintained by the business the caller is attempting to reach.

Two call centers 121 and 122 maintained by the business customer of the network are shown connected to the network by trunks 105 and 106 respectively to switches 123 and 124 respectively. Each call center hosts a number of agent stations, represented by agent stations 131 and 132 in call center 121, and agent stations 133 and 134 in call center 122. Each agent station such as agent station 131 in call center 121 has a personal computer/video display unit (PC/VDU) such as PC/VDU 331 that is connected to a local area network (LAN) 301. PC/VDU 331 is used for displaying information pertinent to an arriving call and also for accessing other needed information from elsewhere in the network. Similarly, agent station 134 in call center 122 has PC/VDU 334 connected to LAN 335.

Agent telephones 136 and 138 are connected to call center switch 123. Agent telephones 140 and 142 residing in agent stations 133 and 134 of call center 122 are connected to call center switch 124. File server 305 is connected to LAN 301 in call center 121. File server 305 may contain additional information that may be required by an agent to perform his or her function such as pricing structures, catalog databases, and the like. A file server may also be present and connected to LAN 335 in call center 122, but is not shown. here. It will be apparent to one with skill in the art that there may be many more than two agent-manned call centers such as call center 121 without departing from the spirit and scope of the present invention.

In this embodiment switch 123 at call center 121 is enhanced by a computer-telephony integration (CTI) processor 223 connected to switch 123 by CTI link 212. Processor 132 executes an instance of T-Server 207, connects to LAN 301, and is also connected by a wide-area data link 210 to processor 208 in the network cloud for data sharing. Similarly CTI processor 224 connects to switch 124 at call center 122 by CTI link 213 executing an instance of T-Server 207. Processor 224 connects to LAN 335 and by data link 211 to processor 208 in the network cloud.

An enhanced routing capability made available by method and apparatus of the present invention provides for sophisticated routing instruction to be delivered to SCP 101 in a way that they may be utilized within the time frame allotted by the telecommunications carrier (from 100 to 500 milliseconds) to route an incoming call to a more specific and appropriate destination associated with that particular call. This innovative approach in a preferred embodiment comprises a corporate database 300 accessible by a data server 310 executing a management and distribution application 312. Corporate database 300 is, in this instance, maintained by the business customer on a non-volatile medium such as a hard disk, however other storage methods such as are known in the art may be used. Data server 310 is connected via link 311 to a digital network link 210/211. Database 300 contains metadata information pertaining to customers, company agents and the like, and application 312 is adapted for managing database updates and the like, and for distributing data from database 300 to other points in the system.

Metadata is pre-analyzed data that can be compactly stored. In a metadata system, for example, selected criteria pertaining to database entities are represented by a letter or number in a coded system, and the data may be stored and transmitted in a very efficient manner because of the compact manner of representation. Examples below will make the concept clear. Metadata maintained in database 300 may include, but is not limited to representation of agent status, customer transaction history, customer credit history, and the like. Virtually any metadata that may aid in routing may be stored in database 300.

In this embodiment local databases are maintained at distributed points in the system. A local database 303 is maintained accessible to processor 208 in the network, and local databases 302 and 301 are maintained at call centers 121 and 122 respectively, accessible to CTI processors 223 and 234. Data server 310 is adapted to mirror metadata to locally distributed databases 301, 302, and 303. In a preferred embodiment of the present invention, periodic updates are performed to the locally distributed databases.

Metadata stored in local database 303 may not be identical to metadata that is stored in local databases 300, 302 and 301. For example, in this embodiment, metadata associated with callers local to SCP 101 is provided to database 303, whereas metadata in local databases 302 and 301 may be of the form of agent availability information and/or statistical system information, and so on. In a preferred embodiment of the present invention, once routing is performed with the aid of metadata stored in local database 303, additional routing may be accomplished with the aid of metadata maintained in database 301 or 302, depending on which call center receives the call. Preferably, synchronization between the main database and distributed metadata databases is not necessarily in real time, but normally rather done at times of low network activity, to preserve bandwidth for other functions, such as agent status.

In a preferred embodiment of the present invention, the metadata stored in local databases is filtered and compressed by methods known in the art and to the inventor and is stored in and used from random access memory (RAM). RAM access times are very small and do not increase as the amount of RAM increases,. The use of relatively expensive RAM is justified by the compact nature of the data, and provides for very rapid access of database information.

In a preferred embodiment customer information may be assigned indices and be represented by digits such as 1–10. In another embodiment, symbols may be used instead of digits. These methods are known in the art and to the inventor and can incorporate much individual data about a customer. In this embodiment T-Server 207 at processor 208 is adapted to access database 303 in RAM and to provide routing to SCP 101. In this process, the router uses an indice provided with the call, such as an Automatic Number Identification (ANI) number, to cross-reference the call to the database. The router accesses the database, retrieving customer characteristics stored as metadata, typically in RAM, and provides a route to the network for the call based on the condensed data. It will be apparent to those with skill in the art that there may be a separate router running on processor 208 or on another processor connected to processor 208. There are a number of alternatives by which the unique functionality may be provided.

Differing types of organizations would logically use differing methods. For example, 10 separate indices may be assigned to callers and coded with digits 1–10. Routing software is adapted to read and understand the meaning of each digit and to use the information to route the call. Some examples of indices that may be applied to a caller are his or her credit rating, marital status, number of children, income level, payment reliability (based on repeat history), and so on. In some embodiments more sophisticated indices may be used that are created based on customer behavior recorded during previous transactions. For example, a weighted average of the caller's mood during the last five contacts with the company may help in routing to various levels of customer service agents, such as those trained to handle an irate caller. Perhaps a scale of 1–10 may be used to rate a particular customer's acceptable level of risk regarding types of investment opportunities at a brokerage house and so on.

If a particular customer has 10 indices using a 1–10 digit scoring system, then each index would require approximately four bits of storage. Adding name and automated number identification (ANI), the entire metadata base for a customer would use approximately 200 bits or 25 bytes of storage. A computer with storage capability of 256 megabytes of RAM could process metadata for about 8 million customers leaving 56 megabytes of RAM for other metadata such as agent availability, system status, product updates, and so on.

It will be apparent to one with skill in the art that there are a number of ways to code customer information into metadata. In one embodiment, symbols may be used instead of digits. In another embodiment a combination of digits and symbols may be used. In yet another embodiment, letters may be used and so on. The unique and innovative method of providing locally distributed metadata for use in intelligent routing from customer access points within the public network can effectively surmount time restrictions imposed on these customer access points by the hosting network communications company.

In a preferred embodiment of the invention a router is provided executing on the processor where metadata in RAM resides for determining routing.

Figure 2:
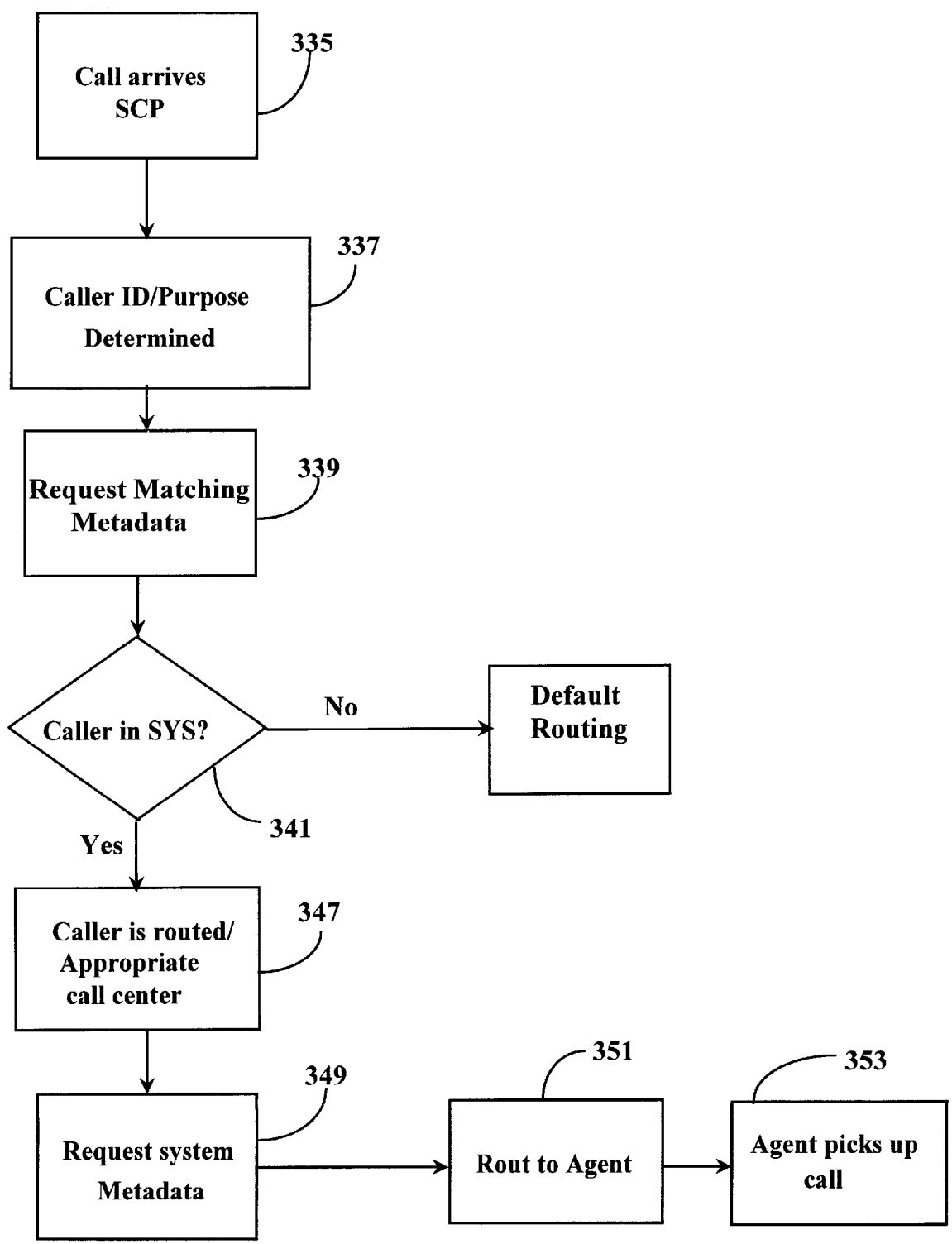
FIG. 2 is a simplified flow diagram illustrating routing procedure in an embodiment of the present invention.

FIG. 2 is a flow diagram illustrating routing procedure in an embodiment of the present invention wherein arriving calls are matched with available metadata stored locally, and then routed to the appropriate destination. A call is first received at SCP 101 of FIG. 1 in step 335. In step 337, caller ID is verified and preliminary information is obtained regarding the nature of the call. This may be accomplished via IVR technology known in the art. A request is then made to T-server 207 for metadata matching the caller information in step 339. Metadata is stored in locally distributed databases such as local database 303 of FIG. 1. These local databases are updated periodically via a dedicated server such as data server 310 as described above with reference to FIG. 1.

If it is determined in step 341 that the caller has no metadata stored because he or she is a new caller, then the call is defaulted in step 343. Default routing may be provided by the customer, or, as a last resort, the business customer's system may default to the network router for default routing. Default routing for new callers can take a number of alternative paths, which may include such steps as eliciting further information from the caller, then routing based on the elicited information, as in the conventional case. However, if there is a metadata record available for the caller in step 341 then that call is routed in step 347 to the appropriate destination or call center switch based on the routing rules of the system.

Once the call is at a call center such as call center 121 of FIG. 1, a request for additional metadata concerning agent availability, system status, and so on may be made in step 349. Additional metadata above would reside in a locally distributed database such as local database 302 of FIG. 1.

For example, an exceptionally aggressive investor may patronize a large brokerage house wherein a designated and specially trained agent is charged with his account. The agent's name and location address would be available with the caller's metadata portfolio and the call would arrive at the central switch connected to that agent. However, that agent may not be available at the time that this particular call arrives. In a case such as this, metadata local to that agent's call center would among other possibilities contain an internal location of one or more back-up agents that are trusted to handle this particular investor's business.

Referring back to FIG. 2, in step 351 the call is internally routed to an appropriate best-fit agent based on metadata as described above. In step 353 the agent picks up the incoming call. Many possibilities exist for the compilation and implementation of metadata both at the network level and at the call center level. The flowchart of FIG. 2 is but one of many possible flow orders. In a preferred embodiment of the present invention, the theoretical final destination of a call will be known while the call is still in the public and/or private network and further routing at the agent level is a "fine tuning" of the original destination based on local metadata reflecting current states available within the call center. However, in other embodiments of the present invention any combination of metadata assignments may be used.

It will be apparent to one with skill in the art that in a metadata-based routing system, metadata may be provided at the public network level only and not in individual call centers. In this case, individual call centers would rely on normal routing procedures once a call has arrived at the central call center switch. In another embodiment, metadata can be used in combination with normal "load balancing" protocols. For example, a metadata database may be created for only special VIP customers allowing better service for those valued customers while non-VIP customers are routed in normal fashion and so on.

In yet another embodiment, local databases may be updated continually in a close to real-time format instead of periodically. For example, a corporate database such as corporate database 300 of FIG. 1 may be connected by a separate network dedicated to monitoring real-time agent and agent-client transactional states such that corporate database 300 may be continually updated during calling hours. By using a pre-configured converter engine in corporate database 300, incoming information may be collected and converted to metadata and associated with a monitored situation whether it be a customer status change, an agent status change, or some other system state that may affect network level routing etc. In this scenario, metadata portfolios would be continually updated automatically in corporate database 300 and distributed to local databases such as local database 303 with a close to real-time network connection allowing resident metadata to be continually updated. In a high powered organization such as a brokerage house, close to real-time updating may be desirable especially where decisions and conditions are time sensitive and volatile.

It will be apparent to those with skill in the art that telephony is no longer limited to conventional intelligent telephone call networks. Data networks such as the Internet now ate capable of simulating telephone calls between computers, wherein computer users may converse through their computers just as with conventional telephony. This is known in the art as Internet Protocol Network Telephony (IPNT). Many skilled artisans now believe that conventional telephone networks and IPNT will merge over time, rather than remaining distinct and competitive. Whether or not this should occur, it should be apparent that the scope of the present invention includes the world of IPNT, as the time advantages of Metadata-based systems may be applicable as well to IPNT systems.

It will also be apparent to those with skill in the art that there are many alternatives to the structure of systems and the uses of software described above in preferred embodiments of the present invention, which may be accomplished without departing from the spirit and scope of the invention. There are, for example, many alternatives to where customer access points may be provided in a network. There are also many alternatives in the way databases may be organized and utilized. There are many alternatives in code structure for software while accomplishing the same or similar purposes. There are many other possibilities which have not been described. The spirit and scope of the present invention is limited only by the claims that follow.

What is claimed is:

1. A method for routing telephone calls in a telephony network maintained by a network service provider, comprising steps of:

(a) accepting a call from a caller at a network routing point;

(b) providing access to the network routing point to a customer of the network service provider for routing the call;

(c) cross-referencing an identifier associated with the call to a database entity in a coded and condensed (metadata-based) information system maintained by the customer;

(d) providing a routing destination to tie network for routing the call to a selected one of plural customer facilities based on the metadata-based information retrieved and (e) employing a second metadata-based information system at the selected facility to further route the call.

2. The method of claim 1 wherein in step (c) the metadata information system is maintained in random access memory (RAM).

3. The method of claim 1 wherein the, in step (c) the metadata-based information system is updated periodically from a central database maintained by the customer.

4. A customer-maintained routing system for providing routing to a network for incoming calls from clients to customer call-centers, comprising:

a processor having a data link adapted for connection to a customer access point provided by the network;

a router adapted to execute on the processor and to provide routing to the network via the customer access point;

a first coded and condensed (metadata-based) information system maintained in RAM accessible to the processor and containing condensed client characteristics; and a second metadata-based information system maintained in RAM residing in at least one of the customer call centers to which incoming calls may be routed;

wherein, upon receiving a request from the network including a call identifier, the router accesses the first information system using the identifier as a key, retrieves client characteristics from the metadata-based information system, and provides a call-center destination for the call to the network based on the retrieved client characteristics, and wherein the call is further routed at the call-center using the second metadata-based information system.

5. The system of claim 4 wherein the processor is linked by a wide area data network to plural customer sites, at least one of which comprises a central database, and at least one of which is a computer-telephony integration (CTI) processor connected to a telephony switch at a customer call center to which incoming calls to the customer may be routed.

6. The system of claim 5 wherein RAM-maintained local metadata-based information systems are periodically updated from a central customer metadata system via the wide area data network.

7. The system of claim 4 wherein the network is the Internet, and the incoming calls are Internet Protocol Telephony (IPT) calls.

8. A telephony network comprising:

a service control point (SCP) adapted to provide a customer access point for routing calls by a customer of the network;

at least one trunk for delivering calls from the SCP to a customer facility;

a customer-maintained routing system including a processor having a data link adapted for connection to the customer access point provided by a network provider, a router adapted to execute on the processor and to provide routing to the network via the customer access point, and a first coded and condensed (metadata-based) information system maintained in RAM accessible to the processor and containing condensed client characteristics; and a second metadata-based information system maintained in RAM residing in the customer facility to which incoming calls may be routed;

wherein, upon receiving a request from the network including a call identifier, the router accesses the database using the identifier as a key, retrieves client characteristics from the information system, provides a destination for the call to the network based on the retrieved client characteristics and the call is further routed at the customer facility using the second metadata-based information system.

9. The telephony network of claim 8 wherein the processor is linked by a wide area data network to plural customer sites, at least one of which comprises a central database, and at least one of which is a computer-telephony integration (CTI) processor connected to a telephony switch at a customer call center to which incoming calls to the customer may be routed via one of the trunks for delivering calls.

10. The system of claim 9 wherein RAM-maintained local metadata-based information systems are periodically updated from a central customer metadata system via the wide area data network.

11. A telephony network characterized by a data access point for a client of the network and a router maintained by the client and coupled to the data access point, wherein the client-maintained router is coupled to a client metadata-structured database maintained in random access memory and having characteristics of callers stored as coded, highly-compressed metadata, wherein the network provides call identification to the router and requests routing from the customer-maintained router, the customer-maintained router provides routing by accessing the metadata-structured database with the call identification as a key, and wherein a second metadata-structured database at a first destination for the call is used to further route the call.

12. The network of claim 11 wherein the network is the Internet and the calls are Internet Protocol Telephony (IPT) calls.

* * * * *